United States Patent [19]

Dean et al.

[11] Patent Number: 4,528,626

[45] Date of Patent: Jul. 9, 1985

[54] MICROCOMPUTER SYSTEM WITH BUS CONTROL MEANS FOR PERIPHERAL PROCESSING DEVICES

[75] Inventors: Mark E. Dean, Boynton Beach; Dennis L. Moeller, Delray Beach, both of Fla.

[73] Assignee: International Business Machines Corporation, Armonk, N.Y.

[21] Appl. No.: 589,692

[22] Filed: Mar. 19, 1984

[51] Int. Cl.[3] .............................................. G06F 9/00
[52] U.S. Cl. ................................................... 364/200
[58] Field of Search ............................... 364/200, 900

[56] References Cited

U.S. PATENT DOCUMENTS

| 4,047,158 | 9/1977 | Jennings | 364/900 |
| 4,112,490 | 9/1978 | Pohlman et al. | 364/200 |
| 4,180,855 | 12/1979 | Buedel | 364/200 |

OTHER PUBLICATIONS

Computer I/O Part V Kolobaud Classroom, published by Peter Stale in Microcomputing, Mar. 1979, pp. 108-112.

Primary Examiner—E. S. Matt Kemeny
Assistant Examiner—John G. Mills
Attorney, Agent, or Firm—Robert Lieber

[57] ABSTRACT

A microcomputer system includes a main processor, a memory and a direct memory access controller (DMA) effective to control direct data transfer between the memory and input/output devices on channels. Bus control for data transfer is switchable between the DMA and processor by a hold request/acknowledge handshaking sequence between the DMA and processor. A control line from the channels is activated by a peripheral processing device on a channel when it wishes to gain control of the busses for data transfer. Logic means coact with the handshaking sequence to determine which device gains control of the busses. This logic is responsive to the DMA address enable output (AEN), the hold acknowledge output of the main processor (HLDA) and the channel control line output (−MASTER). When all these are deactivated, control passes to the main processor, when AEN and HLDA only are activated, control passes to the DMA controller and, when all three are activated, control passes to the peripheral processing device.

8 Claims, 1 Drawing Figure

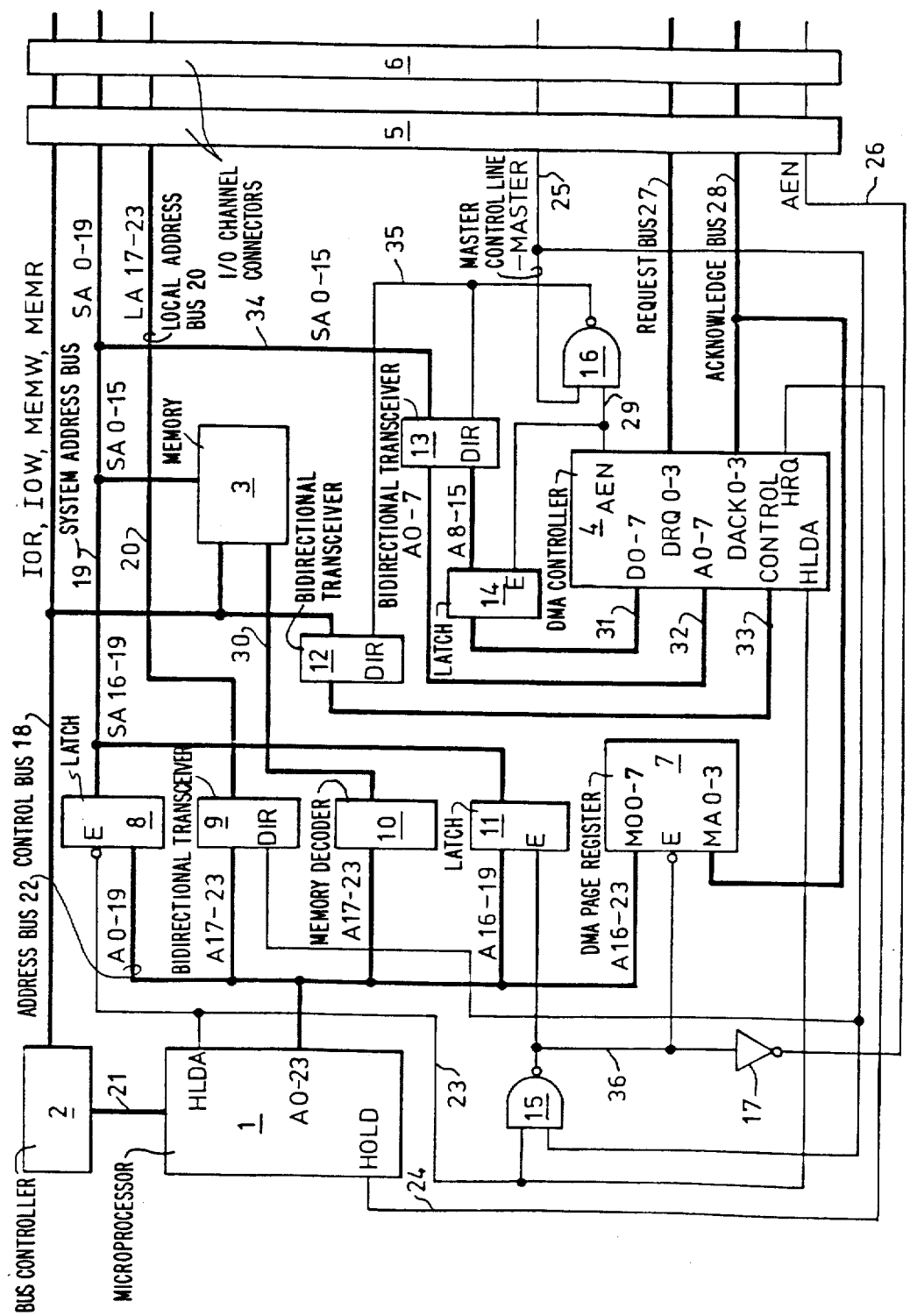

MICROCOMPUTER SYSTEM WITH BUS CONTROL MEANS FOR PERIPHERAL PROCESSING DEVICES

DESCRIPTION

1. Technical Field

The present invention relates to microcomputers and, in particular, to microcomputer systems in which bus control may be passed from the main microprocessor to peripheral processor devices.

2. Background Art

The use of peripheral processing devices which attach to the input/output interface of a main computer system is well known. An early example of such an arrangement is shown in U.S. Pat. No. 3,462,741 (G. H. Bush and K. A. Duke). In that system, the system data and address busses always remain under the control of the main processor device. In such systems, instructions and data are passed from the main system to the peripheral processors, which then process the data, transfer results back to the main processor and wait for the next instructions. It is clear that, in such systems, the peripheral processors act merely as slaves to the main system which severely restricts their function.

Other, larger, systems have been produced in which multiple processors act essentially as equals. All common busses in such systems are normally controlled by contention determining devices which grant bus control to the various processors in response to requests therefrom. The main object of such systems is, of course, to provide common memory and I/O devices for a plurality of processor systems to provide data interchange between the systems. The control systems which resolve contention in such systems are, however, complex and expensive and are not, therefore, entirely suited to microcomputer systems.

It is, therefore, an object of the present invention to provide a simple control arrangement which allows peripheral processor devices to gain control of the system busses of a microprocessor for data transfer.

DISCLOSURE OF THE INVENTION

The present invention relates to a microcomputer system including a main processor and a direct memory access controller (DMA) which controls direct transfer of data between I/O devices and the system memory. Bus control is transferred from the main processor to the DMA following a handshaking request/acknowledge sequence between these devices. Logic circuitry is provided to use a control signal from a peripheral processor device attached to an I/O channel in conjunction with the handshaking sequence to transfer bus control to the peripheral processing device on detection of the control signal.

BRIEF DESCRIPTION OF DRAWING

The single FIGURE is a simplified block diagram of a microcomputer system showing address busses and controls but no data busses.

DETAILED DESCRIPTION

The major components of the FIGURE comprise a microprocessor 1 which may be of the type 80286 manufactured by Intel Corp., a bus controller 2 of the type 82288, also produced by Intel Corp., a memory system 3 and a programmable direct memory access (DMA) device which may be of the type 8237A produced by Intel Corp. All of these major components are coupled, through busses, to a number of input/output channel connectors, of which two, referenced 5 and 6, are shown. Each line of a control bus 18, a system address bus 19 and a local address bus 20 is connected to all of the connectors, as are control lines 25 and 26. The remaining busses 27 and 28 each have four lines, each of which is connected to an associated one of the connectors.

Referring back to microprocessor 1, for simplicity, only a few of the connections to this processor have been shown. These include a hold acknowledge (HLDA) output on line 23. This output is activated in response to a hold request (HRQ) signal applied to the HOLD input over a line 24 from DMA 4. On receipt of a hold request input, processor 1 completes its current bus cycle and then floats its bus drivers to a tristate off condition and activates the HLDA output. This, as will be seen later, frees the system data bus (not shown) for data transfer between memory 3 and an I/O device under control of DMA 4. A control bus 21 couples processor 1 to bus controller 2. This control bus includes a memory/not I/O (MIO) line and bus cycle status signal lines S0 and S1. Bus controller 2 is responsive to the MIO, S0 and S1 signals to define the type of bus cycle to be performed. When MIO is low, the defined bus cycle is an I/O read cycle if S1 is low and S0 is high, or an I/O write cycle if S1 is high and S0 is low. Similarly, when MIO is high, S1 high and S0 low indicate a memory write cycle, or S1 low and S0 high indicate a memory read cycle. For each of these conditions, bus controller 2 issues a respective command signal, either IOR, IOW, MEMW, or MEMR on a respective one of the lines in command bus 18, with the MEMW and MEMR signals going to memory system 3.

The last indicated outputs from processor 1 are twenty-four address outputs A0 through A23 which are applied to an address bus 22. Lines A0 through A19 of this bus are applied to gate 8 which is enabled, at input E, in the absence of a HLDA signal from processor 1. The signals from latch 8 are applied to lines SA0 through SA19 of a system address bus 19, which applies the low order address bits to memory system 3, and I/O devices through connectors 5 and 6. Lines A17 through A23 of address bus 22 are coupled to a bi-directional transceiver 9, which is also coupled to lines LA17 through LA23 of a local address bus 20. These provide the high order address bits for the I/O devices on connectors 5 and 6. It will be noted that these bits are not latched as are bits A0 through A19, so that the high order bits become available prior to the low order bits, thus allowing preselection of devices by the high order bits prior to address selection within a preselected device. Lines A17 through A23 of the address bus 22 are also applied to a memory decoder 10. This decoder is a read-only memory which is responsive to the high order address bits to provide enable signals to select either areas within the system random access memory 3, over a bus 30, or the system control read-only memory (not shown). The actual address within the selected memory is, of course, defined by the lower order address bits on bus 19 either from latch 8 or from an I/O device on a channel connector.

A latch 11 is coupled to receive the A16 through A19 bits from bus 22. This latch, which is enabled from an AND gate 15, is used to direct the A16 through A19 bits to the system address bus 19 during DMA operations. Finally, a DMA page register and control unit 7 are used to apply bits A16 through A23 to address bus 22 during DMA operations. The function of this unit, which may be of the byte SN74LS612 produced by Texas Instruments, Inc., is to expand memory addresses during DMA operations. In brief, this unit includes four 8-bit address registers which can be periodically reloaded from the data bus of processor 1. During DMA operations, these registers can be individually selected by the energization of individual ones of four acknowledge lines in bus 28 applied to inputs MA0 through MA3 of unit 7. Thus, the acknowledge lines, which effect selection of I/O devices for data transfer under DMA control, also provide selection of address bits A16 through A23.

Turning now to DMA controller 4, this unit functions to control direct data transfer between memory 3 and I/O units on the I/O connectors including connectors 5 and 6. A hold request (HRQ) output is applied to the HOLD input of processor 1 which, as mentioned above, responds to a request signal to enter a hold state and issue a hold acknowledge (HLDA) signal over line 23 to the HLDA input of controller 4. Individual DMA requests from I/O units are applied to controller 4 over a request bus 27 to obtain DMA service. These inputs are prioritized with DRQ0 having the highest priority and DRQ3 the lowest. The DMA acknowledge outputs DACK0 through DACK3 are used to notify individual I/O devices of the grant of a DMA cycle. These signals are applied over a bus 28 to the I/O channel connectors and, as mentioned above, to the DMA page register system 7. An address enable output AEN is used to enable addresses during DMA cycles and is applied over a line 29 to a latch 14 and an AND gate 16. Data bus input/output terminals D0 through D7 are coupled to the processor 1 data bus (not shown) and through a bus 30 to latch 14. During program cycles of controller 4, the D0 through D7 terminals receive data from processor 1 to update address registers within the controller. During DMA cycles, these registers deliver address bits A8 through A15 through terminals D0 through D7, latch 14 and a bidirectional transceiver 13 to system address bus 19. Terminals A0 through A7 operate similarly, but their registers need not be latched externally and deliver address bits A0/A7 through bidirectional transceiver 13 to system address bus 19. Control input/output terminals labeled CONTROL, and including I0R, I0W, MEMR and MEMW lines, are coupled to internal control registers in controller 4. During DMA cycles the control data flow is reversed through transceivers 12 to control bus 18.

So far, the essential components for control and addressing from either processor 1 or DMA controller 4 have been described. This means control over the system cannot be exerted by a separate device attached to one of the channel connectors. With the system thus far described, such a device must be responsive to addresses and control signals from either processor 1 or DMA controller 4. For most I/O devices this is, of course, no problem. However, if a channel connector is coupled to a further processor, such as a peripheral processor on a card plugged into the connector, this processor cannot itself determine address and data flow within the system. In order to overcome this problem, a —MASTER line 25 is coupled in common to all the channel connectors. The, or each, peripheral processor is arranged to activate this line in response to an acknowledge signal applied over bus 28 to its corresponding channel connector. Let us assume that such a peripheral processor card is in channel connector 5 and this connector is assigned channel 0. Whenever the peripheral processor wishes to communicate with the system, it generates a DMA request which is applied to the DRQ0 input of controller 4. Controller 4 then responds by issuing a HRQ over line 24 for processor 1 which then enters a hold condition and issues a HDLA output over line 23 to controller 4. In response to the HLDA signal, controller 4 then issues an active high acknowledge signal on the DACK0 line of bus 28 to channel connector 5. The peripheral processor includes an inverter coupled between the DACK line and the —MASTER line 25 and, therefore, drops this line to its active (low) state. The peripheral processor must now wait for at least one system clock period to allow for system reconfiguration before it starts a bus cycle. Line 25 is coupled to AND gate 16, AND gate 15 and to the DIR input of transceiver 9. AND gate 16 also receives the address enable (AEN) output of controller 4. AEN goes high with the DACK signal, but the output of AND gate remains high when the —MASTER line goes low. This output, on line 35, controls transceivers 12 and 13 to transmit from right to left, thereby preventing the transmission of data from controller 4 to the system address bus 19 and the control bus 18.

AND gate 15 receives the HLDA signal on line 23 from processor 1 in addition to the —MASTER signal. With the HLDA high and the —MASTER signal low, the output, on line 36, is high. This will enable latch 11 and disable DMA page register 7. An inverter 17 inverts the high signal on line 36 to drop the AEN signal on line 26 to the channel connectors to an inactive state. It will be recalled that the AEN signal, which is normally connected directly from controller to the channel connectors, is used to enable addresses for DMA cycles. Lastly, the —MASTER signal sets transceiver 9 for transmission from right to left.

The system is now set up for data transfer between the peripheral processor on channel connector 5 and memory 3 or, in fact, any memory or other device coupled to the system except processor 1 and the main control read-only memory. The control signals on bus 18 are provided by the peripheral processor. Gate 8 and transceiver 13 both now prevent data passing to bus 19 from the processor 1 address outputs at controller 4 address outputs. However, address signals from the peripheral processor on bus 19 are applied to memory 3 and, through latch 11, to bus 22. The A16 through A19 signals from this latch are applied through bus 22 to memory decoder 10 to provide suitable enabling signals to select memory 3 over bus 30 if memory 3 is to be selected. The local address bits, which as before, are unlatched, are now provided from line 20, through transceiver 9, to decoder 10 over bus 22.

The peripheral processor can now perform as many bus cycles as it requires as long as it holds its DRQ line to DMA controller 4 on bus 27 active. If, however, memory 3 is a dynamic random access memory, these peripheral bus cycles are limited to allow for memory refresh using either the DMA or a separate refresh system (not shown). After the peripheral processor completes its bus cycles, it tristates its bus drivers to an OFF condition, and drops its DRQ line to the inactive (low) condition. This releases the system back to control from processor 1, controller 4 or another peripheral processor device.

In summary, what has been described is a microcomputer system in which the system can be controlled by either the system microprocessor, the DMA controller, or a peripheral processing device. A logic circuit system looks at the hold acknowledge (HLDA) output of the main processor, a −MASTER input from the peripheral processing device and the address enable (AEN) output of the DMA controller to reconfigure the system address and control busses. When the AEN is low, −MASTER is high and HLDA is low, control passes to the main processor. When AEN, −MASTER and HLDA are all high, control passes to the DMA controller. When AEN is high, −MASTER is low and HLDA is high, control passes to the peripheral processing device.

While the invention has been described herein with reference to a particular embodiment, it will be understood by those skilled in the art that various changes in form and detail may be made without departing from the spirit and scope of the invention.

What is claimed is:

1. A microcomputer system comprising:
   a main processor, a memory system, a plurality of input/output channels, wherein the main processor is operatively connected to said memory and to said input/output channels;
   a direct memory access controller operatively connected between said memory and said input/output channels, said direct memory access controller operable to control direct data transfer between the memory and input/output devices on the input/output channels, said direct memory access controller being responsive to an individual request signal from an input/output channel to generate a hold request signal for the processor, which in response thereto, switches to a hold condition in which it relinquishes control of the system address, data, and control busses and issues a hold acknowledge signal to which the direct memory access controller responds by gaining control of the busses, by issuing an address enable signal, and by issuing a further acknowledge signal to the requesting input/output channel for said direct data transfer between that input/output channel and the memory;
   said microcomputer system including a master control line coupled commonly to all of the input/output channels, said master control line being activated by a requesting peripheral processor operatively coupled to one of the input/output channels in response to said further acknowledge signal applied to the input/output channel corresponding to the requesting peripheral processor;
   said master control line coupled to a logic means responsive to the activation of said master control line to remove control of said system busses from said direct memory access controller and from said main processor and thereby to transfer control of said system to the requesting peripheral processor;
   said logic means including a first bidirectional transceiver coupling high order address bits to either memory or input/output channels within the system and to determine whether said main processor, said direct memory access controller, or said peripheral processor has momentary control of said system; and
   said master control line further coupled to the control input of said transceiver whereby whenever said master control line is deactivated, said high order bits are passed to a memory select decoder so that either the main processor or direct memory access controller have system control and whenever said master control line is deactivated, said high order bits are passed through said transceiver so that the peripheral processor has system control.

2. A microcomputer system according to claim 1 including a second bidirectional transceiver coupled between the control output lines of said controller and the system control bus and a third bidirectional transceiver coupled between the address output lines of said controller and the system address bus, and a first logic circuit having its inputs coupled to the address enable output of the controller and said master control line and an output line coupled to the direction control inputs of said second and third transceiver whereby signals are directed from the controller to said system control and address busses only when the address enable output is activated and the master control line is deactivated.

3. A microcomputer system according to claim 2 in which the address enable output is active high, the master control line is active low and said first logic circuit comprises an inverting AND gate.

4. A microcomputer system according to claim 1 including a first latch circuit coupling low order address bits from the main processor to a system address bus to select memory locations within selected memory devices in the system and channels, said first latch circuit having an enable input coupled to the hold acknowledge output of the main processor to enable the first latch circuit only when said hold acknowledge output is deactivated.

5. A microcomputer system according to claim 1 including a second logic circuit having its inputs coupled to the hold acknowledge output of the main processor and said further control line, and an output coupled to the enable input of a second latch circuit coupling high order bits of the system address bus to said memory select decoder whereby said second latch circuit is disabled only when the hold acknowledge line is activated and the master control line is deactivated.

6. A microcomputer system according to claim 5 in which the output of said second logic circuit is applied to the enable input of a direct memory access page register system effective to generate high order address bits for said memory decoder under control of said controller, whereby the page register system is enabled only when the hold acknowledge output of the main processor is activated and the master control line is deactivated.

7. A microcomputer system according to claim 6 in which the output of said second logic circuit is coupled through an inverter to a channel address enable input coupled in common to the channels which, when activated, enables addresses in the channels for data transfer, said channel address enable input being activated only when the hold acknowledge line is activated and the master control line is deactivated.

8. A microcomputer system according to claim 7 in which said hold acknowledge line is active high, said master control line is active low, said enable input to the second latch circuit is active high, said enable input to the page register system is active low, said channel address enable input is active high and said second logic circuit comprises an inverting AND gate.

* * * * *

UNITED STATES PATENT AND TRADEMARK OFFICE
CERTIFICATE OF CORRECTION

PATENT NO. : 4,528,626

DATED : July 9, 1985

INVENTOR(S) : Mark E. Dean and Dennis L. Moeller

It is certified that error appears in the above—identified patent and that said Letters Patent is hereby corrected as shown below:

In Claim 1, Column 6, line 5, delete "deactivated" and substitute --activated--.

Signed and Sealed this

Fourth Day of July, 1989

Attest:

DONALD J. QUIGG

*Attesting Officer*

Commissioner of Patents and Trademarks